(12) United States Patent
Iwao

(10) Patent No.: US 11,854,420 B2
(45) Date of Patent: Dec. 26, 2023

(54) INFORMATION PROCESSING APPARATUS HAVING POSITION INFORMATION OF PARTS OF SUBJECTS ACQUIRED AT DIFFERENT TIMINGS, INFORMATION PROCESSING METHOD, AND STORAGE MEDIUM

(71) Applicant: CANON KABUSHIKI KAISHA, Tokyo (JP)

(72) Inventor: Tomoyori Iwao, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 744 days.

(21) Appl. No.: 16/447,244

(22) Filed: Jun. 20, 2019

(65) Prior Publication Data

US 2020/0005670 A1    Jan. 2, 2020

(30) Foreign Application Priority Data

Jun. 29, 2018   (JP) .................................. 2018-125011

(51) Int. Cl.
*G09B 19/00* (2006.01)
*G06T 7/246* (2017.01)
*G09G 5/377* (2006.01)
*G06T 13/40* (2011.01)
(Continued)

(52) U.S. Cl.
CPC ......... *G09B 19/0038* (2013.01); *G06T 7/246* (2017.01); *G06T 7/73* (2017.01); *G06T 13/40* (2013.01); *G09B 5/02* (2013.01); *G09G 5/377* (2013.01); *G06T 2200/04* (2013.01); *G06T 2207/30196* (2013.01); *G09G 2354/00* (2013.01)

(58) Field of Classification Search
None
See application file for complete search history.

(56) References Cited

U.S. PATENT DOCUMENTS 5,184,295 A * 2/1993 Mann .................... A63B 60/46
                                                                703/2
5,249,967 A * 10/1993 O'Leary ............ A63B 24/0003
                                                              434/257
11,367,364 B2 * 6/2022 May ..................... A61B 5/486
(Continued)

FOREIGN PATENT DOCUMENTS

JP            4646209 B2      3/2011
WO       2014/042121 A1      3/2014

*Primary Examiner* — Edward Martello
(74) *Attorney, Agent, or Firm* — CANON U.S.A., INC. IP Division

(57) ABSTRACT

An information processing apparatus acquires first physical makeup information representing a physical makeup of a first object. The first physical makeup information is information generated based on images obtained by imaging the first object with a plurality of imaging apparatuses in a plurality of directions. The information processing apparatus acquires second physical makeup information representing a physical makeup of a second object and motion information representing motion of a plurality of parts of the second object. The information processing apparatus generates motion information associated with the first physical makeup information based on the second physical makeup information and the motion information relating to the second object.

19 Claims, 11 Drawing Sheets

(51) Int. Cl.
*G09B 5/02* (2006.01)
*G06T 7/73* (2017.01)

(56) References Cited

U.S. PATENT DOCUMENTS

| | | | | |
|---|---|---|---|---|
| 2004/0209698 | A1* | 10/2004 | Ueda | A63B 24/0006 |
| | | | | 473/150 |
| 2005/0196737 | A1* | 9/2005 | Mann | A63B 69/3623 |
| | | | | 434/247 |
| 2012/0206577 | A1* | 8/2012 | Guckenberger | G09B 19/003 |
| | | | | 348/47 |
| 2015/0255005 | A1* | 9/2015 | Yoda | G06T 17/00 |
| | | | | 434/265 |
| 2016/0029943 | A1* | 2/2016 | Mizuochi | A61B 5/0022 |
| | | | | 600/595 |
| 2018/0357472 | A1* | 12/2018 | Dreessen | G06V 40/23 |
| 2019/0078892 | A1* | 3/2019 | Ellis | A63B 24/0062 |
| 2020/0273229 | A1* | 8/2020 | Thielen | G06T 19/006 |
| 2021/0113906 | A1* | 4/2021 | Wyeth | A63B 69/3621 |

* cited by examiner

INFORMATION PROCESSING APPARATUS HAVING POSITION INFORMATION OF PARTS OF SUBJECTS ACQUIRED AT DIFFERENT TIMINGS, INFORMATION PROCESSING METHOD, AND STORAGE MEDIUM

BACKGROUND

Field

The present disclosure relates to a technique to process information relating to a physical makeup and motion of an object.

Description of the Related Art

Some sports participants ("learners") correct their form based on a form of a model proficient in the particular sport in question. For example, a golfer can work on correcting their form by comparing an image, captured by a camera, of their form with an image of a form of a model.

Japanese Patent No. 4646209 discusses superimposing a skeleton image representing a model form drawn with a wire frame, which is internally translucent or transparent, on a moving image of a subject and displaying the result to facilitate comparison of the form of the subject with the model form. Japanese Patent No. 4646209 discusses adjusting a position, a direction, a size, etc. of the skeleton image via a user operation, which enables to more correctly superimpose the skeleton image on the moving image of the subject.

The technique discussed in Japanese Patent No. 4646209, does not in some cases enable the subject to realize a posture to achieve the most proficient motion represented by the model form. For example, in a case where a physical makeup of the subject and a physical makeup of the model are different from each other, the learner cannot take a same posture as the model form, and cannot achieve the proficient motion even when the learner forcibly takes a posture close to the model form.

SUMMARY

The present disclosure is directed to providing information useful for a person (e.g., learner) to achieve motion of another person (e.g., model).

According to an aspect of the present disclosure, an information processing apparatus includes a first acquisition unit configured to acquire first physical makeup information representing a physical makeup of a person as a first object, the first physical makeup information being generated based on images obtained by imaging the first object with a plurality of imaging apparatuses in a plurality of directions, a second acquisition unit configured to acquire second physical makeup information representing a physical makeup of a person as a second object and motion information representing motion of a plurality of parts of the second object, and a generation unit configured to generate motion information associated with the acquired first physical makeup information based on the acquired second physical makeup information and the acquired motion information representing the motion of the plurality of parts of the second object.

Further features will become apparent from the following description of exemplary embodiments with reference to the attached drawings.

DESCRIPTION OF THE EMBODIMENTS

An exemplary embodiment of the present disclosure is described with reference to drawings. The following exemplary embodiment is not seen to be limiting, and all of combinations of features described in the present exemplary embodiment are not necessarily essential for solutions provided by the present disclosure. Like components are described with like numerals.

[Configuration of Analysis System]

Figure 1:
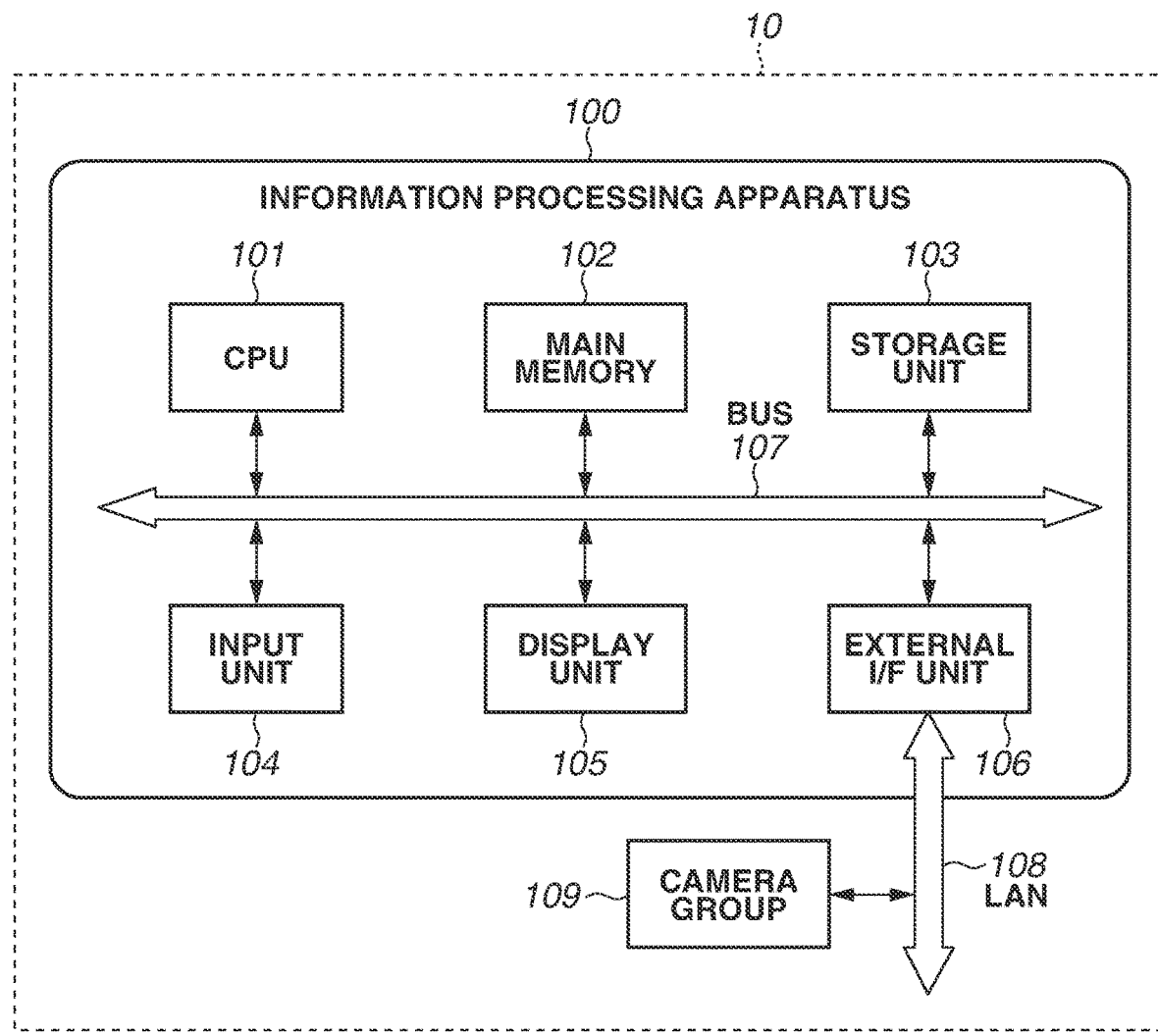
FIG. 1 is a diagram illustrating an example of a configuration of an analysis system according to an exemplary embodiment.

FIG. 1 is a diagram illustrating an example of a configuration of an analysis system 10 according to the present exemplary embodiment. The analysis system 10 illustrated in FIG. 1 includes an information processing apparatus 100 and a plurality of imaging apparatuses (camera group) 109. The information processing apparatus 100 includes a central processing unit (CPU) 101, a main memory 102, a storage unit 103, an input unit 104, a display unit 105, and an external interface (I/F) unit 106, where these units are connected to each other via a bus 107.

The CPU 101 is an arithmetic processing unit that controls the information processing apparatus 100, and executes various types of programs stored in the storage unit 103, etc. to perform various processing. The information processing apparatus 100 can include one or a plurality of types of dedicated hardware different from the CPU 101, and the dedicated hardware can execute at least a part of the processing to be executed by the CPU 101. Examples of the dedicated hardware include an application specific integrated circuit (ASIC), a field programmable gate array (FPGA), and a digital signal processor (DSP). The main memory 102 temporarily stores data, parameters, etc. used in various kinds of processing, and provides a work area to the CPU 101. The storage unit 103 is a large-capacity storage unit that stores various types of data necessary for various types of programs and for display of graphical user interface (GUI). For example, a hard disk or a nonvolatile memory such as a silicon disc is used.

The input unit 104 includes a device such as a keyboard, a mouse, an electronic pen, and a touch panel, and receives operation input from a user. The display unit 105 includes a liquid crystal panel, and displays analysis result on a GUI, etc. The external I/F unit 106 is connected to external apparatuses such as cameras included in the camera group 109 via a local area network (LAN) 108, and performs transmission/reception of image data and control signal data. The bus 107 connects the above-described units, and performs data transfer. The camera group 109 is connected to the information processing apparatus 100 via the LAN 108, and starts or stops imaging, changes camera settings (shutter speed, diaphragm, etc.), and transfers captured image data, based on control signals from the information processing apparatus 100. The camera group 109 includes one or more cameras, and the number of cameras is not limited.

The configuration of the analysis system 10 is not limited to the above-described configuration. For example, the information processing apparatus 100 may not be connected to the camera group 109. The information processing apparatus 100 can be connected to a storage device (not illustrated) that stores data based on the imaging by the camera group 109 via the LAN 108, and can acquire data based on the imaging from the storage device. For example, the information processing apparatus 100 may not include one or more of the input unit 104 or the display unit 105. At least the input unit 104 or the display unit 105 can be provided as a separate unit external to the information processing apparatus 100, and the CPU 101 can operate as an input control unit controlling the input unit 104 and as a display control unit controlling the display unit 105.

Figure 10:
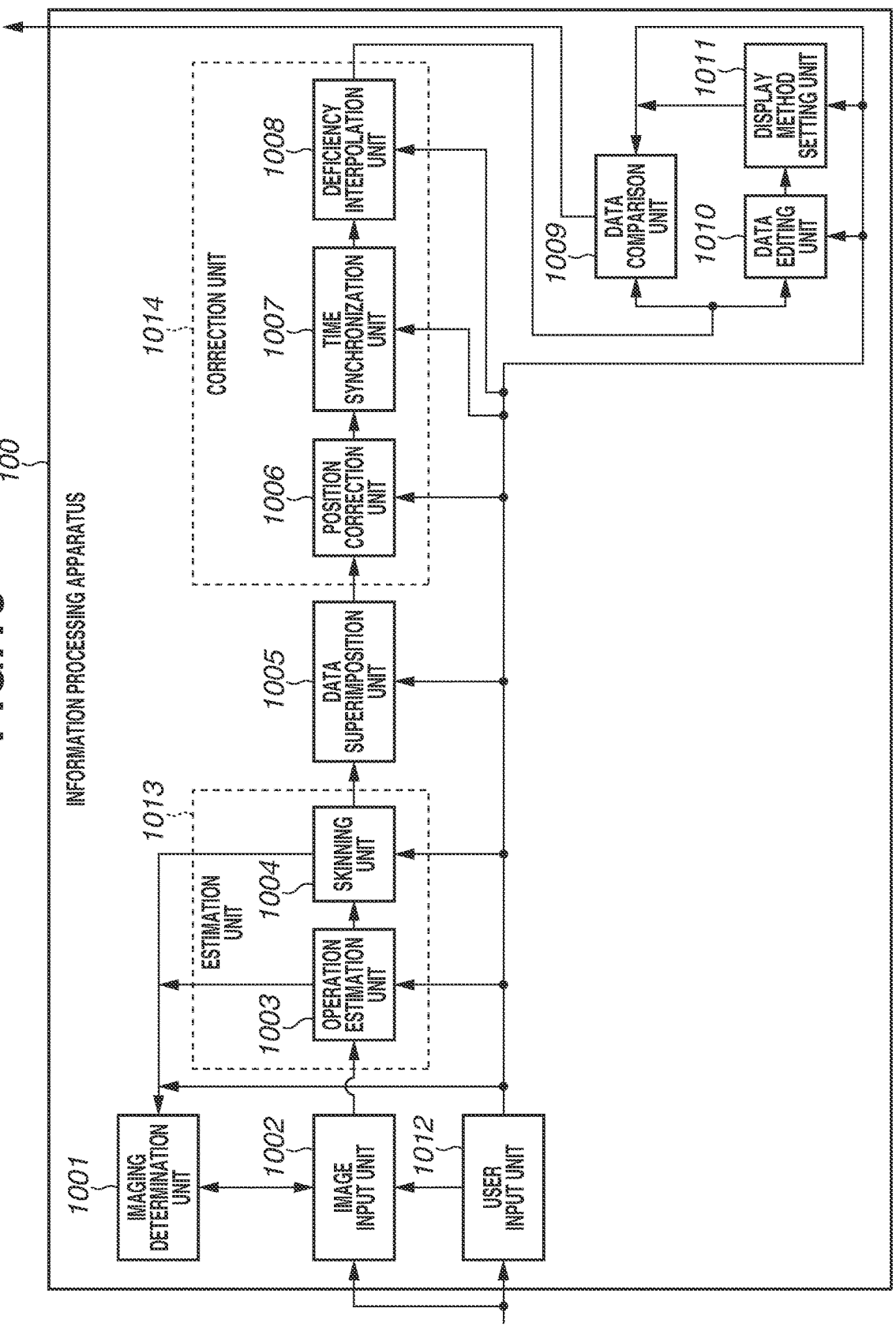
FIG. 10 is a block diagram illustrating an example of a functional configuration of the information processing apparatus according to the exemplary embodiment.

FIG. 10 is a diagram illustrating an example of a functional configuration of the information processing apparatus 100 according to the present exemplary embodiment. The information processing apparatus 100 includes an imaging determination unit 1001, a data superimposition unit 1005, a data comparison unit 1009, a data editing unit 1010, a display method setting unit 1011, a user input unit 1012, an estimation unit 1013, and a correction unit 1014. The estimation unit 1013 includes an operation estimation unit 1003 and a skinning unit 1004. The correction unit 1014 includes a position correction unit 1006, a time synchronization unit 1007, and a deficiency interpolation unit 1008. These functional units included in the information processing apparatus 100 are implemented when the CPU 101 executes various types of programs stored in the storage unit 103, etc. Any of these functional units can be implemented by the dedicated hardware. The detail of each of the functional units included in the information processing apparatus 100 is described below with reference to a flowchart.

Figure 2:
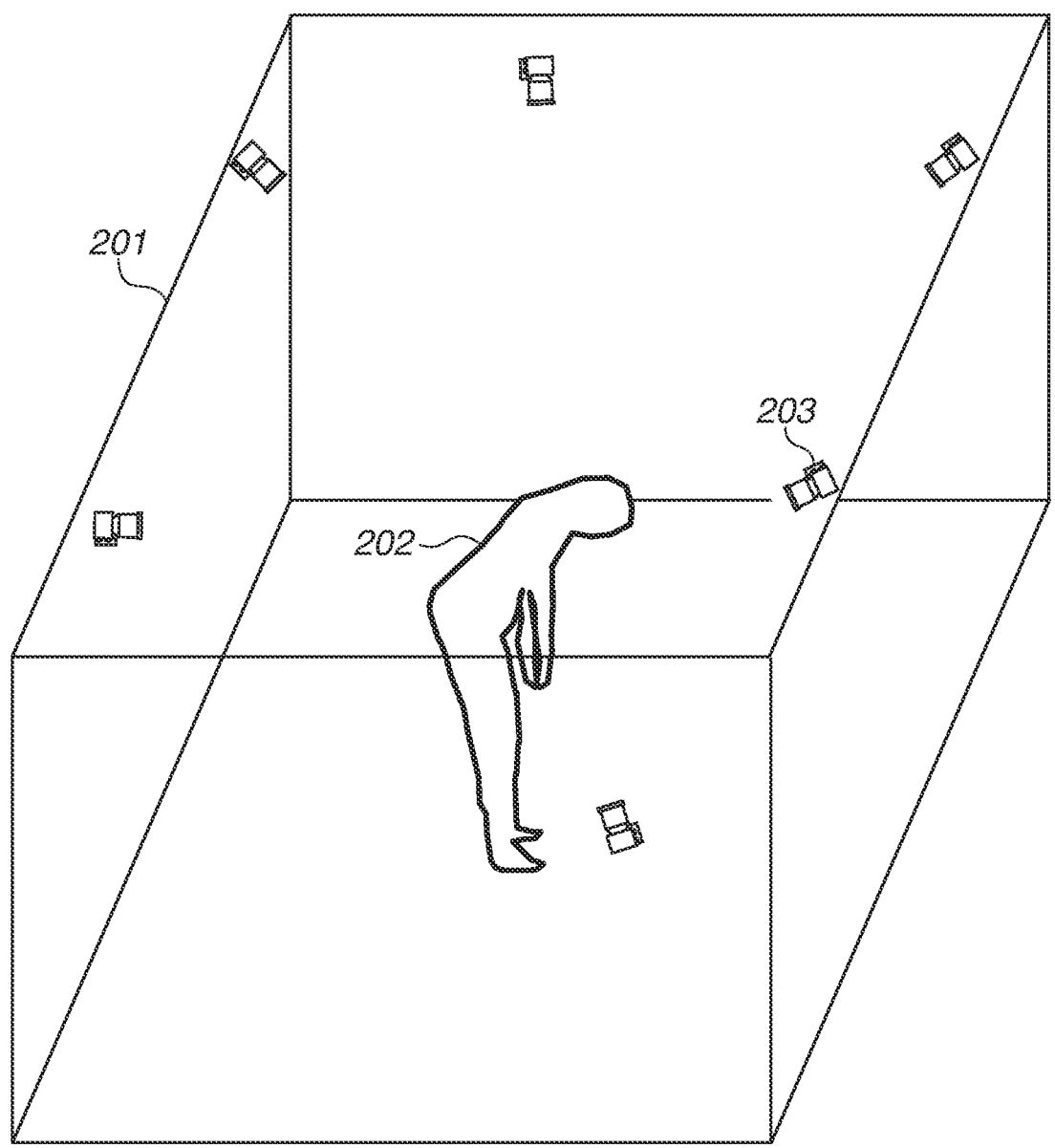
FIG. 2 is a diagram illustrating imaging with a camera group according to the exemplary embodiment.

FIG. 2 is a diagram illustrating an installation example of the cameras included in the camera group 109. While there are many objects that can be analyzed, for example, sports and acting performances, an example of analyzing a golf swing will be described in the present exemplary embodiment. In the following description, the term "learner" refers to an individual who is trying to achieve the motion of another person, who may be referred to as a "model". In FIG. 2, a learner as an object 202 is located in a space 201, and six cameras 203 are installed to image the object 202 in a plurality of directions. Imaging parameters such as a camera direction, a focal length, and exposure control parameters are set in each of the cameras 203 included in the camera group 109 such that the whole of the space 201 or a region of interest including the object 202 in the space 201 is included in a viewing angle of each of the cameras 203.

[Description of GUI]

Figure 3:
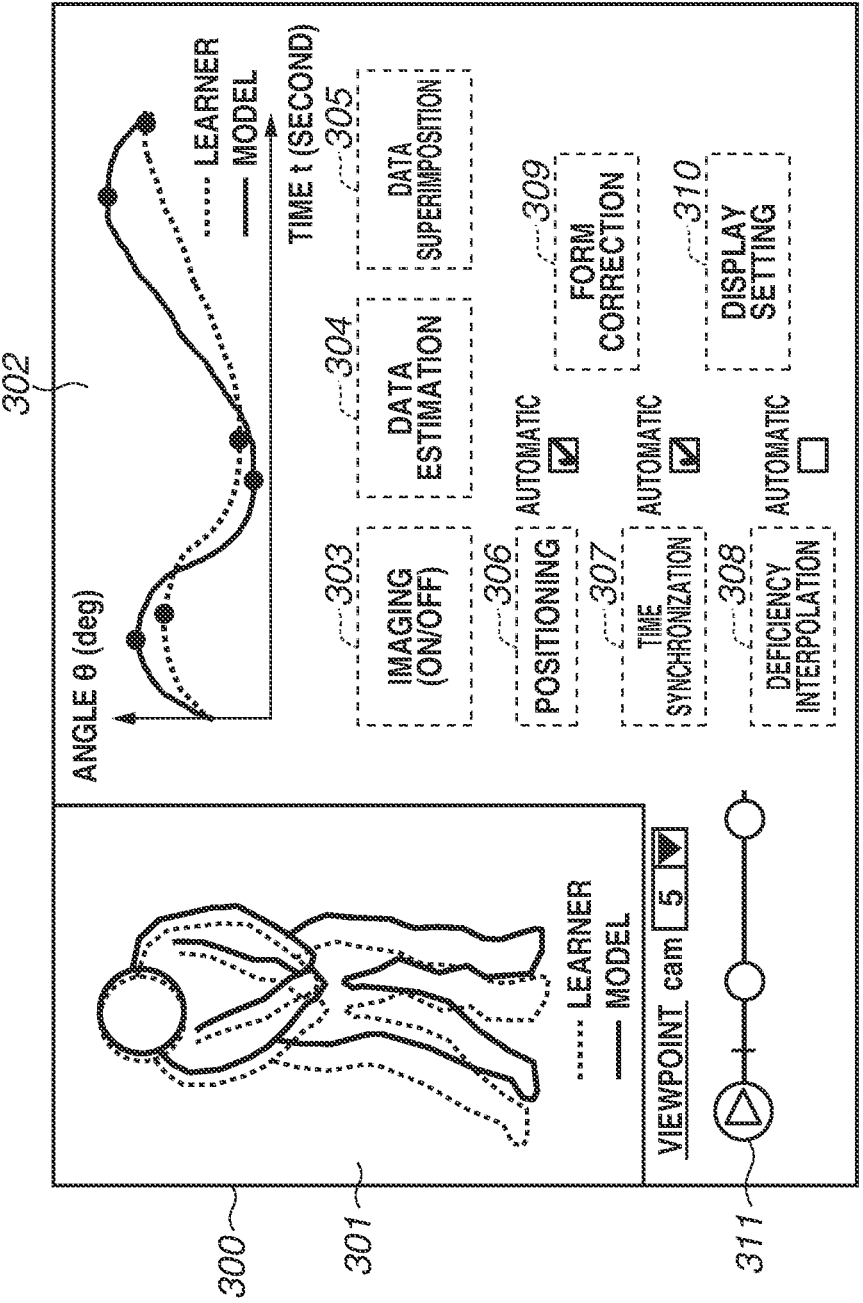
FIG. 3 is a diagram illustrating an example of a data estimation graphical user interface (GUI) according to the exemplary embodiment.
Figure 4:
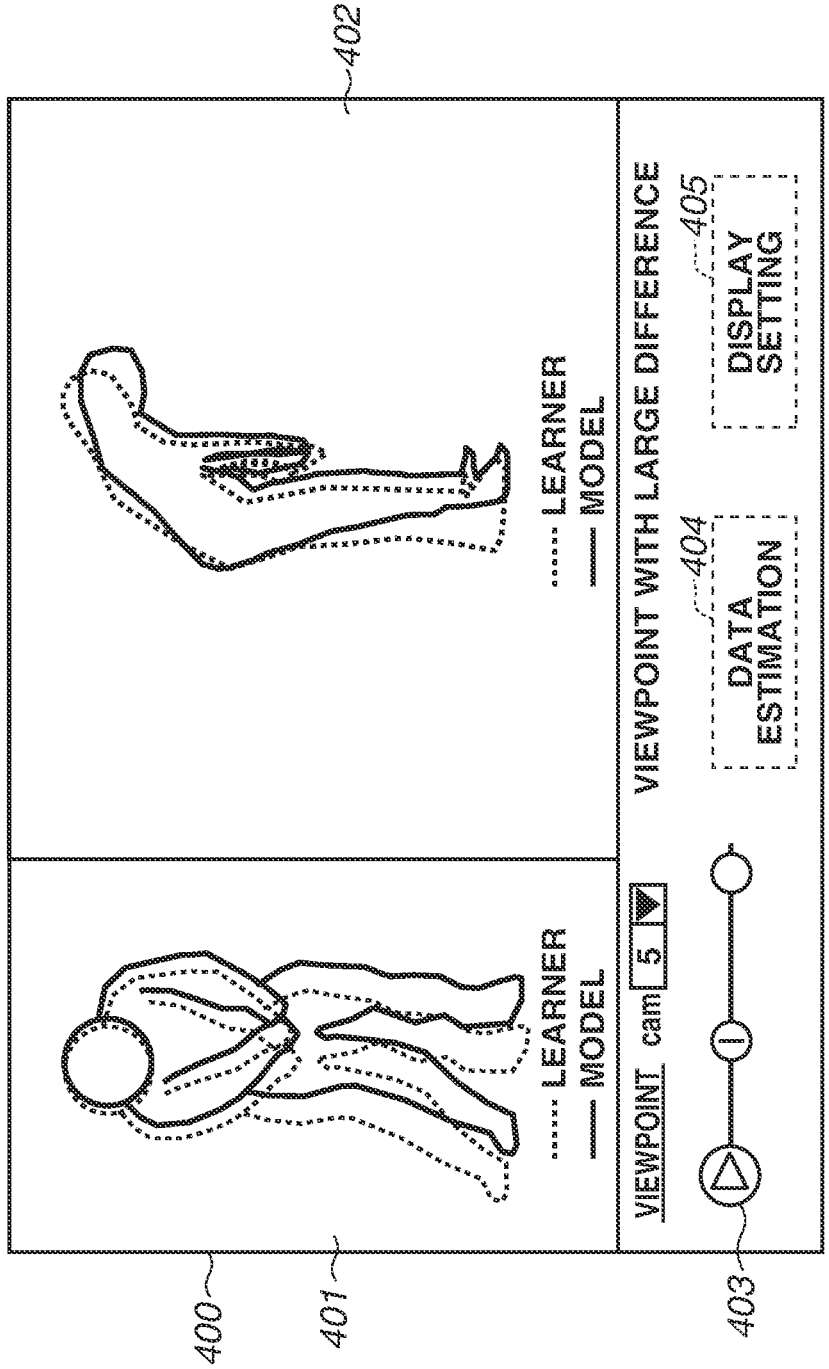
FIG. 4 is a diagram illustrating an example of a form correction GUI according to the exemplary embodiment.
Figure 5:
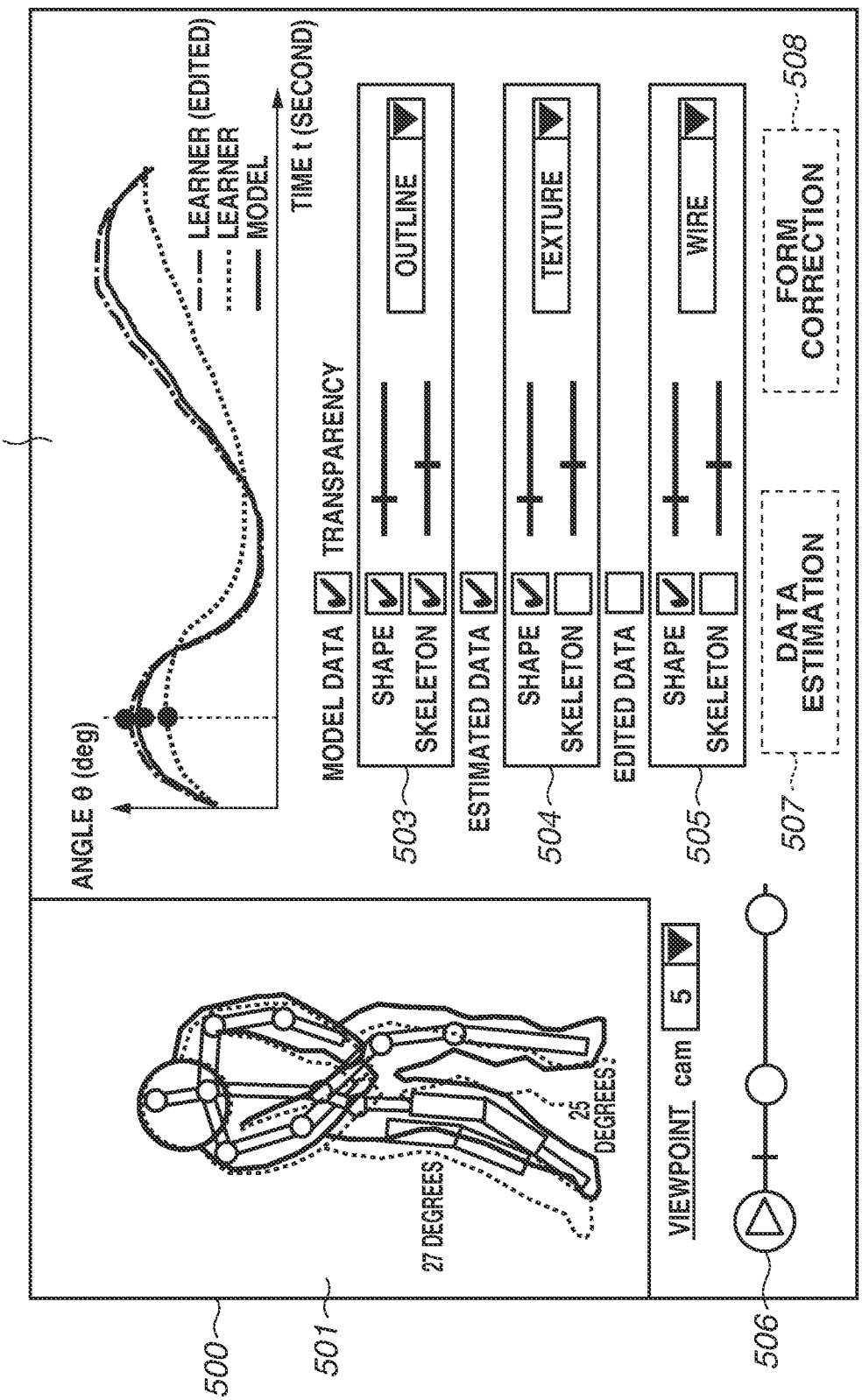
FIG. 5 is a diagram illustrating an example of a data display setting GUI according to the exemplary embodiment.

FIG. 3, FIG. 4, and FIG. 5 are diagrams each illustrating an example of a GUI displayed by the analysis system 10 according to the present exemplary embodiment. These screens are displayed on the display unit 105 of the information processing apparatus 100. Alternatively, these screens can be displayed on another display apparatus (not illustrated) connected to the information processing apparatus 100. FIG. 3 illustrates a basic screen of the GUI that is an example of a screen displayed in data estimation. A data estimation GUI 300 includes an image display area 301, an analyzed data display area 302, an imaging button 303, a data estimation button 304, and a data superimposition button 305. The data estimation GUI 300 also includes a positioning button 306, a time synchronization button 307, a deficiency interpolation button 308, a form correction shifting button 309, a display setting shifting button 310, and a seek bar 311.

FIG. 4 illustrates an example of a screen that is displayed to correct the form by the learner. A form correction GUI 400 includes an image display area 401, a different viewpoint display area 402 for form correction, a seek bar 403, a data estimation shifting button 404, and a display setting shifting button 405. FIG. 5 illustrates an example of a screen that is displayed for display setting of data. A data display setting GUI 500 includes an image display area 501, an edited data display area 502, a display setting area 503 for model data, a display setting area 504 for learner data, and a display setting area 505 for edited data. The data display setting GUI 500 also includes a seek bar 506, a data estimation shifting button 507, and a form correction shifting button 508.

Operation on the GUI and operation of the information processing apparatus 100 in response to the operation on the GUI are described below. The operation on the GUI is performed by the user with, for example, the mouse and the touch panel. When the imaging button 303 is pressed in the data estimation GUI 300, the information processing apparatus 100 outputs an instruction, to the camera group 109, to start capturing moving images of the learner's swing from multiple viewpoints. When the imaging button 303 is pressed again while the camera group 109 is capturing the moving images, the information processing apparatus 100 outputs an instruction to end capturing the moving images to the camera group 109.

When the data estimation button 304 is pressed after the camera group 109 ends capturing the moving images, the information processing apparatus 100 estimates three-dimensional shape data (hereinafter, referred to as shape data) and skeleton data of the learner based on the captured images, and the image of the learner based on the estimated result is displayed in the image display area 301. In the present exemplary embodiment, the shape data about the object such as the learner and a model represents an outer shape of the object, and the skeleton data about the object represents a bone structure of the object. The skeleton data representing the bone structure of the object is expressed by, for example, markers indicating positions of a plurality of joints of the object and line segments connecting the markers. For example, the image displayed in the image display area 301 is an image captured from the viewpoint of any of the cameras included in the camera group 109. In the present exemplary embodiment, the image captured from the viewpoint of the camera (tentatively, Cam 7) that captures images of the learner from a front side is displayed.

When the data superimposition button 305 is pressed, the information processing apparatus 100 displays an image representing motion of the model by superimposing the image representing motion of the model on the image of the learner displayed in the image display area 301. At this time, the information processing apparatus 100 can display an image representing shape data and skeleton data about the model, or display an image representing a result obtained by applying motion information on the model to the skeleton data about the learner. Applying the motion information on the model to the skeleton data about the learner makes enables generating an image representing a state where the motion of the model is reproduced with the physical makeup of the learner. When the information processing apparatus 100 displays the images being superimposed, the information processing apparatus 100 can transparently or translucently display one or more of the image of the learner or the image representing the motion of the model.

The information processing apparatus 100 displays information relating to the motion of the learner and the information relating to the motion of the model in the analyzed data display area 302 so that the information relating to the motion of the learner can be compared with the information relating to the motion of the model. The contents to be displayed here include change of an angle of a specific joint in each object with time, and an inflection point in the change of the angle. The angle information on the joint to be displayed can be selected based on the user operation, or the information processing apparatus 100 can automatically select a joint of which the motion is largely different between the learner and the model.

When any of the positioning button 306, the time synchronization button 307, and the deficiency interpolation button 308 is pressed, the information processing apparatus 100 corrects one or more of the model data or the learner data in order to enable the learner to easily compare the form of the learner with that of the model. At this time, if an automatic check box displayed next to each of the buttons is checked, the corresponding correction is automatically performed. If the automatic check box is not checked, the correction is performed in response to user operation to perform manual correction. The correction result of the data is reflected on the image in the image display area 301 and the image in the analyzed data display area 302.

When operation to move the seek bar 311 is performed, the information processing apparatus 100 displays an image corresponding to a time point based on a position of the seek bar 311 in the image display area 301. A position corresponding to a specific time point when, for example, motion difference between the learner and the model is large can be displayed on the seek bar 311. For example, in FIG. 3, a circle on the seek bar 311 indicates a time when the motion difference between the learner and the model is large, specified by the information processing apparatus 100. When the form correction shifting button 309 is pressed, the information processing apparatus 100 shifts the displayed screen to the form correction GUI 400. When the display setting shifting button 310 is pressed, the information processing apparatus 100 shifts the displayed screen to the data display setting GUI 500.

When the screen is shifted to the form correction GUI 400, an image similar to the image in the image display area 301 is displayed in the image display area 401. An image captured from the viewpoint at which the motion difference between the learner and the model is the largest is displayed in the different viewpoint display area 402. The learner can correct the form while viewing the data displayed in the area. The functions of the seek bar 403 and the display setting shifting button 405 are similar to those described in the description regarding the data estimation GUI 300. When the data estimation shifting button 404 is pressed, the information processing apparatus 100 shifts the displayed screen to the data estimation GUI 300.

When the screen is shifted to the data display setting GUI 500, the shape data and the skeleton data about the model and the learner are displayed in the image display area 501. The information processing apparatus 100 edits the shape data and the skeleton data about the learner based on the user operation in the data display setting GUI 500, and displays the edited shape data and the edited skeleton data in the image display area 501. Only the shape data or the skeleton data can be displayed, or only the shape data or the skeleton data can be editable. When a joint of the object (model or learner) in the image display area 501 is designated by the user operation, a bent state of the joint, etc. is quantitatively displayed in the image display area 501. A graph of the bent state of the joint designated in the image display area 501 is displayed in the edited data display area 502. The user can display a state where the learner performs motion similar to the motion of the model in the image display area 501 by editing the shape data and the skeleton data about the learner to bring the state of the joint of the learner and the state of the joint of the model closer to each other while viewing the edited data display area 502. The information processing apparatus 100 can automatically edit the shape data and the skeleton data about the learner to bring the state of the joint designated by the user operation closer to the state of the joint of the model, and can also automatically edit a joint not designated.

An image is displayed in the display setting area 503 for model data, the display setting area 504 for estimated data, and the display setting area 505 for edited data so that the user selects displaying or not displaying various kinds of data and then selects a display format in a case where the user selects displaying the various kinds of data. For example, when a shape of the object is selected as a display target, texture is selected as the display format, and transparency is set to an intermediate value (50%) as illustrated in the display setting area 504 for estimated data in FIG. 5, the shape data is displayed in translucent color (with texture). The functions of the seek bar 506, the data estimation shifting button 507, and the form correction shifting button 508 are similar to those described in the description about the data estimation GUI 300 and the form correction GUI 400.

[Flow of Processing by Information Processing Apparatus]

The processing to be performed by the information processing apparatus 100 is described with reference to flowcharts illustrated in FIG. 6, FIG. 7, FIG. 8, and FIG. 9 and a block diagram illustrated in FIG. 10. The processing illustrated in these flowcharts is achieved when the CPU 101 reads predetermined programs from the storage unit 103 and loads the programs to the main memory 102, and the CPU 101 executes the loaded programs. FIG. 10 illustrates the functional configuration of the information processing apparatus 100, and the functional units are implemented when the CPU 101 executes the above-described programs. At least a part of the processing in the flowcharts and the functional units of the information processing apparatus 100 can be implemented by one or a plurality of types of dedicated hardware different from the CPU 101.

Figure 6:
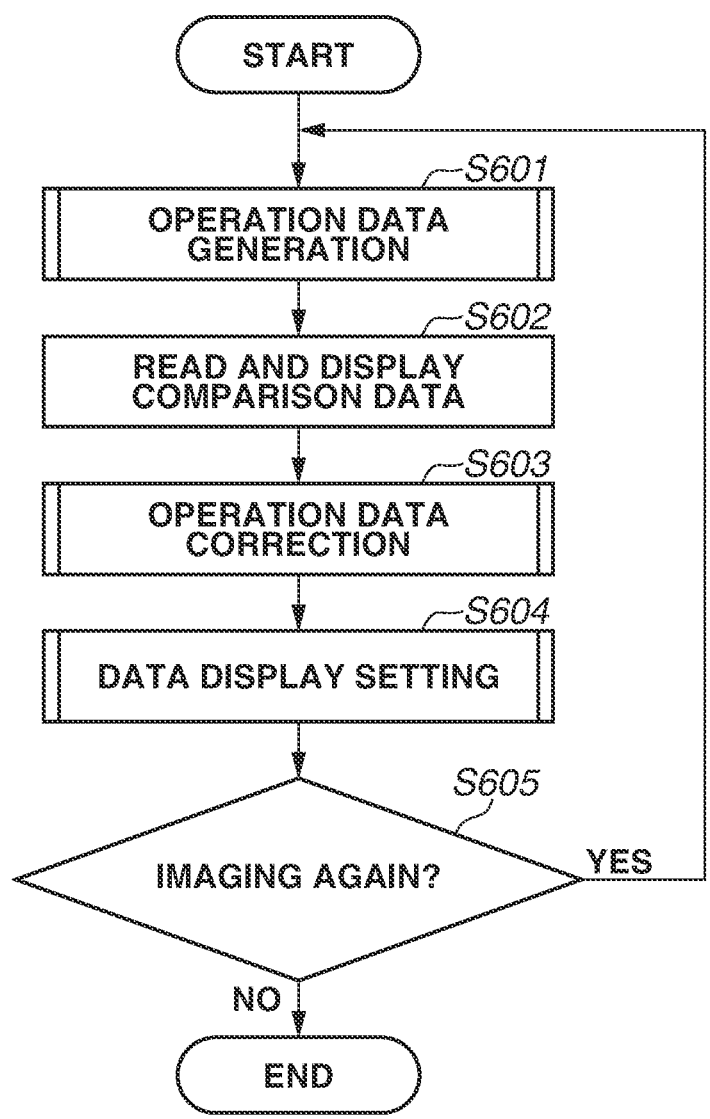
FIG. 6 is a flowchart illustrating operation of an information processing apparatus according to the exemplary embodiment.

The outline of the processing to be performed by the information processing apparatus 100 is described with reference to the flowchart illustrated in FIG. 6 and the block diagram illustrated in FIG. 10. The processing illustrated in FIG. 6 can be started at timing when the initial setting of the analysis system 10 including the camera group 109 is completed. The start timing of the processing illustrated in FIG. 6, however, is not limited to the above-described timing. For example, after the data obtained by imaging the object such as the learner in the plurality of directions is input to the information processing apparatus 100, the processing illustrated in FIG. 6 can be performed at a timing when operation to display the image for form comparison is performed by the user.

In step S601, the operation estimation unit 1003 generates operation data (data about shape and skeleton motion) about the object based on the moving image input to the image input unit 1002, and the skinning unit 1004 associates the shape data and the skeleton data with each other. The detail of the processing in step S601 is described below with reference to FIG. 7. In step S602, the data superimposition unit 1005 reads and acquires operation data about the model that is to be compared with the operation data about the learner. The operation data about the model includes information representing the physical makeup (shape data and skeleton data) of the model and information representing motion of the model. In the present exemplary embodiment, the information representing the motion of the object such as the model and the learner is represented as information representing motion of the skeleton including a plurality of joints and connection parts thereof, namely, as motion information representing the motion of the plurality of joints of the object. The contents of the motion information are not limited thereto, and the information may represent motion of a part different from the joint, for example, a middle part between the joints. In the present exemplary embodiment, the case where the information processing apparatus 100 acquires and processes both the shape data and the skeleton data about the object as the information representing the physical makeup of the object is described. The processing, however, is not limited thereto, and the information processing apparatus 100 can acquire at least one of the shape data or the skeleton data, and perform similar processing.

The model data read by the data superimposition unit 1005 can be automatically selected with reference to attribute information (age, gender, body height, weight, etc.) input by the user. The target data can be selected by the user from a plurality of pieces of data stored in a database. The data to be read can be selected using an attribute of the learner determined based on the captured image. The model data can be previously generated based on images obtained by imaging the model by a plurality of cameras in a plurality of directions, or can be generated by other computer graphics processing.

In step S603, the position correction unit 1006 and the time synchronization unit 1007 perform positioning and time synchronization, respectively, on the operation data about the learner and the operation data about the model. The deficiency interpolation unit 1008 performs deficiency interpolation if there is a deficiency in the data. The detail of the processing in step S603 is described below with reference to FIG. 8. These processing can be performed selectively, and execution of all of the processing is not essential. In the time synchronization, the model data can be adjusted to match with the learner data as opposed to processing to adjust the learner data to match with the model data. In the present exemplary embodiment, a case where the learner data is adjusted to match with the model data is described.

In step S604, the data comparison unit 1009 performs comparison of the data, and displays a result of the comparison in a display area of the GUI. At this time, the data editing unit 1010 and the display method setting unit 1011 can perform editing of the data and setting of the display method, respectively, and the results are reflected on the image displayed in the display area. The detail of the processing in step S604 is described below with reference to FIG. 9. In step S605, the imaging determination unit 1001 determines whether to perform imaging again by the camera group 109 based on an input to the user input unit 1012. In a case where the imaging is not performed again (NO in step S605), the processing ends. In a case where the imaging is performed again (YES in step S605), the imaging determination unit 1001 transmits an imaging instruction to the camera group 109 via the LAN 108, and the imaging is then started.

Figure 7:
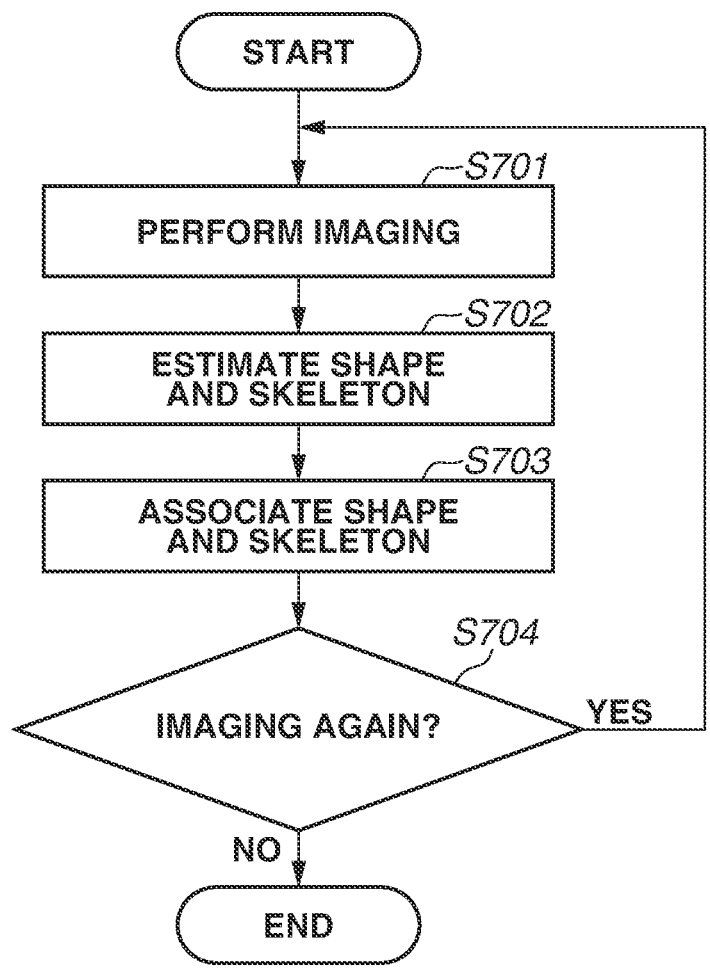
FIG. 7 is a flowchart illustrating operation data estimation processing to be performed by the information processing apparatus according to the exemplary embodiment.
Figure 8:
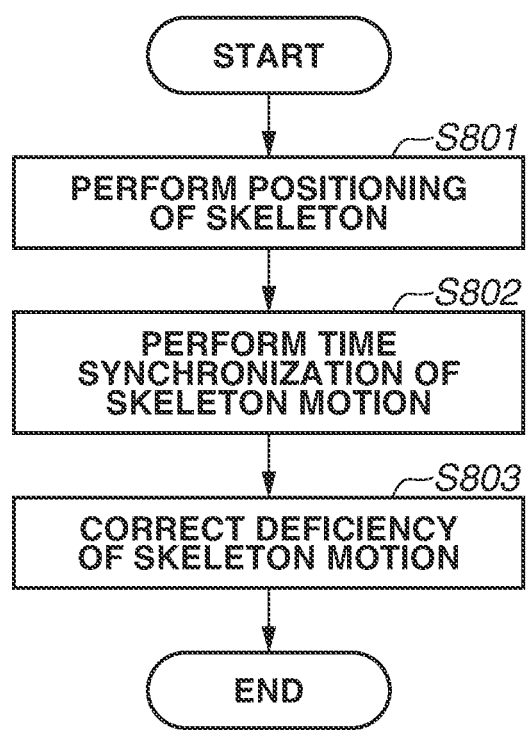
FIG. 8 is a flowchart illustrating estimated data correction processing to be performed by the information processing apparatus according to the exemplary embodiment.
Figure 9:
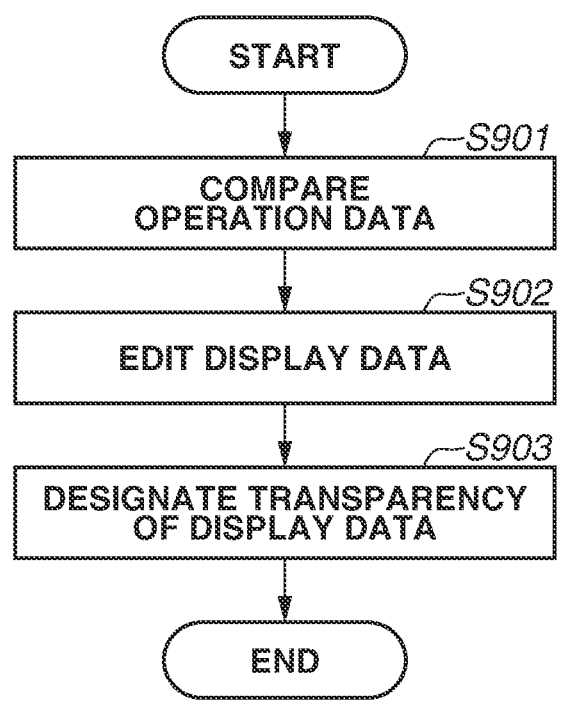
FIG. 9 is a flowchart illustrating data display setting processing according to the exemplary embodiment.

The details of the above-discussed steps are described with reference to the flowcharts illustrated in FIG. 7, FIG. 8, and FIG. 9, and the block diagram illustrated in FIG. 10. At this time, the processing by each of the functional units is executed when the user input unit 1012 receives a user input to the above-described GUI and an instruction corresponding to the input is output to each of the units.

The generation of the operation data in step S601 is described with reference to FIG. 7 and FIG. 10. FIG. 7 illustrates detailed flow of the processing in step S601. In step S701, the imaging determination unit 1001 transmits an imaging instruction to the camera group 109 via the LAN 108 in response to pressing of the imaging button 303. The plurality of cameras included in the camera group 109 images the learner in the plurality of directions in response to the instruction. Moving images acquired by imaging the learner are read to the main memory 102 via the LAN 108, the external I/F unit 106, and the bus 107. When the imaging button 303 is pressed again, imaging of the moving images is stopped.

In step S702, the operation estimation unit 1003 reads the moving images based on the above-described imaging from the main memory 102 in response to pressing of the data estimation button 304, and generates the operation data about the learner based on the moving images. The operation data generated at this time includes information representing the physical makeup (estimated result of shape data and skeleton data) of the learner and information representing motion (estimated result of skeleton motion) of the learner. The generated operation data is output to the skinning unit 1004. Examples of the method of estimating the shape of the object from the images captured in the plurality of directions include a visual cone intersection method. The visual cone intersection method is a method in which silhouettes of an object are extracted from images captured from a plurality of viewpoints, and the silhouettes are projected to a three-dimensional space to determine intersections, thereby acquiring three-dimensional shape data about the object. The method of estimating the shape of the object is not limited thereto, and various methods can be used.

In the present exemplary embodiment, as the method of estimating the skeleton data from the moving images, a method of estimating the skeleton data with use of the above-described estimated shape data is described. Rough irregularities of a human shape are fixed depending on parts of the body. For example, a human structure in which a neck is thinner than a head and a part lower than the neck is branched into right and left shoulders and a chest, is typical. Information on such rough irregularities can be used to estimate the skeleton data. When a cross-sectional shape is scanned from the head to feet of a standing human, a structure in which the cross-sectional shape is gradually expanded/contracted and branched can be confirmed. From such a structure, joints of the head, the neck, the shoulders, elbows, wrists, a vicinity of a pelvis, thighs, knees, and ankles are calculated, and the skeleton data is generated so as to connect the joints. The method of estimating the skeleton data, however, is not limited to the above-described method.

In step S703, the skinning unit 1004 associates the shape data and the skeleton data with each other based on the operation data output from the operation estimation unit 1003, and outputs a result of the association to the data superimposition unit 1005. Skinning that is processing performed by the skinning unit 1004 is processing to associate the skeleton motion and deformation of vertices of a surface shape of the object corresponding to the skeleton with each other. As one of the skinning methods, there is a method of determining a deformation degree of the shape based on a distance from a joint located at a root of the skeleton to the vertex of the surface shape. For example, the vertex at a position three-dimensionally close to the joint is slightly moved, and the vertex at a position three-dimensionally far from the joint is largely moved. In a case where the movement of the vertex is determined based only on the three-dimensional distance, however, a defect such as movement of the vertex of an abdomen in response to movement of the joint of an arm can occur. For this reason, a method of appropriately performing skinning using a geodesic distance and the three-dimensional distance on the shape data is also used. These are examples of the skinning processing, and the specific contents of the processing by the skinning unit 1004 are not limited thereto.

In step S704, the imaging determination unit 1001 determines whether to perform imaging by the camera group 109 again. For example, in a case where a failure degree of any of the shape data and the skeleton data estimated in step S702 is greater than a predetermined threshold, the imaging determination unit 1001 can transmit the imaging instruction to the camera group 109, and the imaging can be repeated. For example, the information processing apparatus 100 can display a screen for selecting either performing or not performing the imaging again, and can transmit an instruction to perform the imaging again in response to the user operation. In a case where the imaging is to be performed again (YES in step S704), the processing is returned to step S701, and imaging of the moving images and estimation of the shape data and the skeleton data are performed again. In the present exemplary embodiment, the imaging determination unit 1001 determines in step S704 whether to perform the imaging again as an example, but the information processing apparatus 100 can detect pressing of the imaging button 303 at optional timing and outputs the instruction for the imaging again.

After the processing in step S601 ends, the model data is read in step S602, and the learner data and the model data are displayed. To display the data, a plurality of methods is considered. For example, there is a method in which an unprocessed image representing the shape and the skeleton motion of the model is superimposed on the image of the learner. For example, there is a method of displaying the image of the learner with the motion of the model by applying the skeleton motion of the model to the skeleton data of the learner. Various additional display methods can also be considered. In the present embodiment, a case where the image representing the motion of the learner and the image representing the shape of the learner with the motion of the model are superimposed and displayed is described. As described above, the shape data and the skeleton data are associated with each other in step S703. Accordingly, when the data representing the skeleton motion of the model is transferred onto the skeleton data of the learner, the shape data about the learner is deformed based on the motion, and the image representing the shape of the learner with the motion of the model can be acquired.

The image representing the motion of the learner, which is one of the images to be displayed, may be a captured image obtained by imaging the learner by a camera, or an image (e.g., image representing skeleton motion) based on the motion information on the learner generated by processing in step S601. In the present exemplary embodiment, a case where, as the image corresponding to the motion of the model that is the other of the images to be displayed, an image representing the three-dimensional shape of the learner performing the motion of the model is displayed is described. The image, however, is not limited thereto, and the skeleton image of the learner performing the motion of the model may be displayed. The information processing apparatus 100 can display, on the display unit, the image corresponding to a display mode selected from a plurality of display modes for displaying the above-described various contents. In this way, an image easily visible by the user can be provided.

Figure 11:
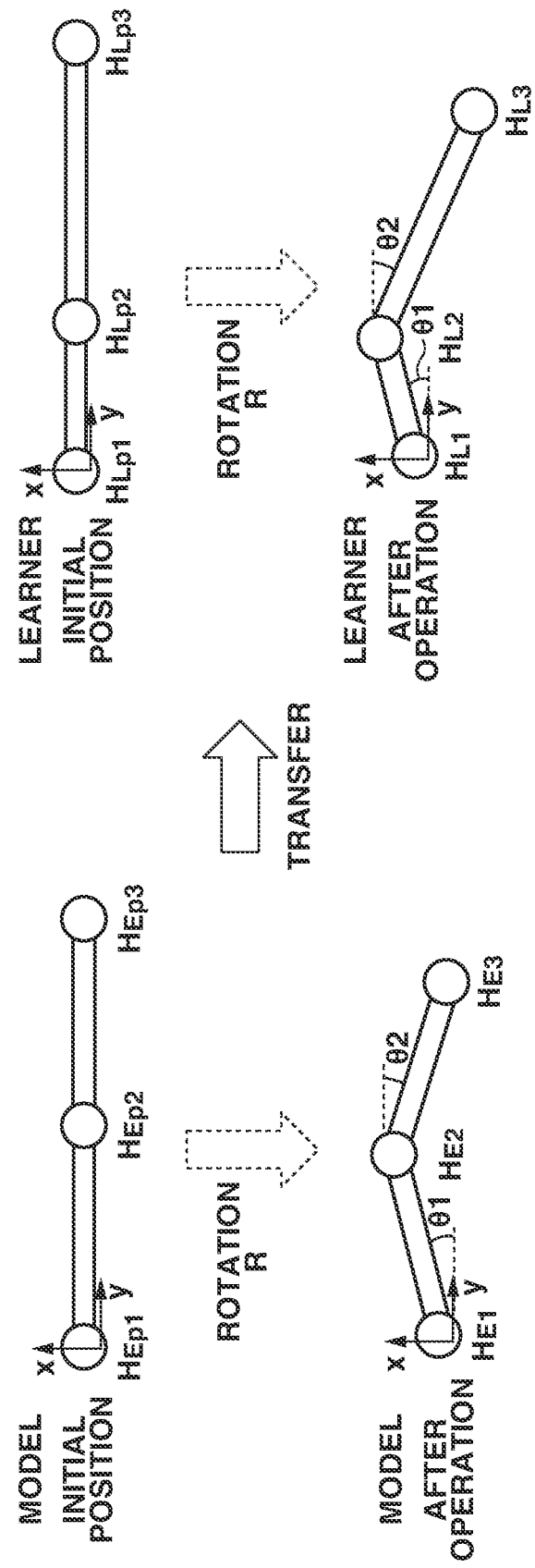
FIG. 11 is a diagram illustrating rotation transfer according to the exemplary embodiment.

The transfer of the skeleton motion is described with reference to FIG. 11. An initial joint position of the model is denoted by $H_{EP}$, a joint position of the model after operation is denoted by $H_E$, an initial joint position of the learner is denoted by $H_{LP}$, and a joint position of the learner after operation is denoted by $H_L$. A rotation matrix $R_\theta$ that represents rotation of a joint is defined. The rotation matrix with respect to the joint of the model is defined by the following expressions (1) to (3).

$$\overrightarrow{H_{E1}H_{E2}} = R_{\theta 1}\overrightarrow{H_{Ep1}H_{Ep2}} \quad (1)$$

$$\overrightarrow{H_{E2}H_{E3}} = R_{\theta 2}\overrightarrow{H_{E1}H_{E2}} \quad (2)$$

$$\overrightarrow{H_{E2}H_{E3}} = R_{\theta 2}R_{\theta 1}\overrightarrow{H_{Ep1}H_{Ep2}} \quad (3)$$

It is assumed that a vector representing the skeleton between the joints is normalized. When this is transferred to the joint of the learner, the rotation of the joint is represented by expressions (4) and (5).

$$\overrightarrow{H_{L1}H_{L2}} = R_{\theta 1}\overrightarrow{H_{Lp1}H_{Lp2}} \quad (4)$$

$$\overrightarrow{H_{L2}H_{L3}} = R_{\theta 2}R_{\theta 1}\overrightarrow{H_{Lp1}H_{Lp2}} \quad (5)$$

While two-dimensional rotation of the joint is described for simplification in this example, three-dimensional rotation can be also transferred in a similar manner. As described above, when only the rotation of the joint is transferred, only a bent state of the joint can be changed without changing the position of the reference joint.

The skeleton motion of the model is transferred onto the skeleton data about the learner in the above-described manner, so that the skeleton data about the learner can perform the motion of the model. In other words, the information processing apparatus 100 can generate the motion information associated with the skeleton data representing the physical makeup of the learner, based on the skeleton data representing the physical makeup of the model and the motion information representing the motion of the plurality of joints of the model. The information processing apparatus 100 can display, on the display unit, the image based on the motion information associated with the skeleton data about the learner and the image representing the motion of the learner based on imaging of the learner by the camera (image based on data acquired by processing in step S601). These images all correspond to the physical makeup of the learner, where one of the images represents the motion of the learner and the other image represents the motion of the model.

In the case where the image representing the motion of the model and the image representing the motion of the learner are superimposed and displayed, the information processing apparatus 100 performs the positioning and the time synchronization on the skeleton data to facilitate comparison between the image representing the motion of the model and the image representing the motion of the learner. In a case where a deficiency occurs on the data as a result of estimation of the shape data and the skeleton data with use of the data based on the imaging, processing to interpolate the deficiency is performed. The processing in step S603 to perform the positioning, the time synchronization, and the deficiency interpolation on the skeleton data is described with reference to FIG. 8 and FIG. 10. FIG. 8 illustrates detailed flow of the processing in step S603.

In step S801, the position correction unit 1006 performs positioning on the skeleton data representing the motion of the model and the skeleton data about the learner, and outputs resultant data to the time synchronization unit 1007. Rough positioning can be performed using a reference joint H near the pelvis of a human including many skeleton branches, as a reference point of the positioning of the skeleton data. In other words, the positioning for display is performed such that a rotation axis and a position of the reference joint HL of the learner and a rotation axis and a position of the reference joint HE of the model are superimposed on each other. A specific joint as a reference of the positioning may not be the joint near the pelvis. For example, in a case where motion of a wrist of a baseball pitcher is compared, positioning can be performed on a position of a joint of the wrist. For example, the positioning can be performed based on a centroid of each of the learner and the model without being limited to the joint. In a case where the automatic check box is checked when the positioning button 306 is pressed, the position correction unit 1006 automatically performs the positioning based on the reference joint. In a case where the automatic check box is not checked but a specific joint is designated, the position correction unit 1006 performs the positioning based on the designated joint.

In step S802, the time synchronization unit 1007 performs the time synchronization between the motion of the model and the motion of the learner, and outputs the synchronized operation data to the deficiency interpolation unit 1008. For example, in a case where a moving image representing motion of golf swing by the model and a moving image representing motion of golf swing by the learner are displayed, the time synchronization processing is performed such that specific time points such as moments of impact in both images are synchronized with each other. More specifically, the synchronization processing is performed based on inflection points in the skeleton motion illustrated in the analyzed data display area 302. In a case where the skeleton motion of the learner based on the captured data includes noise, smoothing processing to eliminate the noise is performed before determination of the inflection points in the skeleton motion. As a smoothing method in a time direction, for example, a mean value filter, a median filter, and a Gaussian filter can be used. The time synchronization unit 1007 calculates a plurality of times t that satisfy an expression (6) with respect to smoothed operation data S(f(t)), thereby determining the inflection points. The processing can be performed on all of the joints or can be performed on one or more predetermined joints.

$$\frac{dS(f_L(t))}{dt} = 0 \tag{6}$$

The time synchronization unit 1007 performs the processing also on the operation data about the model to calculate inflection points in the motion of the model. The time synchronization unit 1007 sets a start time and an end time of the motion of the learner to coincide with a start time and an end time of the motion of the model before matching the inflection points based on these results. The time synchronization unit 1007 can eliminate, from the comparison target, unnecessary data such as a time series that is included in the operation data about the model but is not included in the operation data about the learner, and a time series that is not included in the operation data about the model but is included in the operation data about the learner. After this processing is appropriately performed, the time synchronization unit 1007 associates the inflection points in the motion of the model and the inflection points in the motion of the learner with each other. Examples of the method of associating the inflection points include a method using change of inclination near each of the inflection points in the graph representing the motion of the joint. The inclination near each of the inflection points is calculated from a differential equation, and change c in the inclination with respect to the time t of each of the inflection points is recorded (expression (7)). A matrix in which the change in the inclination corresponding to each time t is recorded is denoted by T. For example, in a case of a matrix TE(m, n) in which the inflection points of the model and the change in the inclination at each of the inflection points are recorded, m=tm and n=ctm are established for an m-th inflection point from the beginning.

$$c = \begin{cases} 1 & \text{if } \left(\frac{d^2 S(f(t-\Delta t))}{dt^2} > 0\right) \cap \left(\frac{d^2 S(f(t+\Delta t))}{dt^2} < 0\right) \\ -1 & \text{if } \left(\frac{d^2 S(f(t-\Delta t))}{dt^2} < 0\right) \cap \left(\frac{d^2 S(f(t+\Delta t))}{dt^2} > 0\right) \end{cases} \tag{7}$$

The inflection points are matched using the time of each of the inflection points and the change in the inclination before and after each of the inflection points. As an example, a case where inflection points are matched from a start time of the operation data is described. In a case where the inflection points are searched from the start time, an inflection point $t_{E1}$ immediately after start of the operation data about the model is searched. It is determined whether there is an inflection point near the inflection point $t_{E1}$ in the operation data about the learner. In a case where there is only one corresponding inflection point, the inflection point is regarded as a matching point $t_{L1}$. In a case where there is a plurality of corresponding inflection points, an inflection point having an inclination before and after the inflection point coincident with the inclination of the inflection point $t_{E1}$ out of the plurality of corresponding inflection points is regarded as a matching point $t_{L1}$. In a case where there is a plurality of inflection points each having an inclination coincident with the inclination of the inflection point $t_{E1}$, an inflection point closer to the inflection point $t_{E1}$ is regarded as a matching point $t_{L1}$. After the matching point $t_{L1}$ is found out, expansion/contraction in the time direction is performed. The data about a section from a time 0 to a time $t_{L1}$ is multiplied by $t_{E1}/t_{L1}$, and the section data is smoothly connected to data about a subsequent section (expression (8)).

$$f(t) = \begin{cases} f_L\left(\frac{t_{L1}}{t_{E1}}t\right) & (0 \le t \le t_{L1}) \\ f_L(t - (t_{E1} - t_{L1})) & (t \ge t_{L1}) \end{cases} \quad (8)$$

In a case where there is no matching point, this processing is not performed, and next inflection point is processed. Thereafter, the processing on each section is repeated until the final inflection point in the motion of the model is processed, thereby performing the time synchronization. The inflection points may not be necessarily matched from the start time of the motion. The inflection points can be matched reversely from the end time of the motion, or the time synchronization can be performed based on one or more time points each having motion feature, such as moment of impact in golf.

In step S803, the deficiency interpolation unit 1008 performs the deficiency interpolation on the skeleton motion of the learner, and outputs interpolated operation data to the data comparison unit 1009 and the data editing unit 1010. The time synchronization of the skeleton motion is performed based on the inflection points in the skeleton motion. Therefore, if there is a deficiency in the learner data at a time point between the inflection points, the interpolation is performed using the model data at the same time point. A start time of the deficiency is denoted by $t_{Lr1}$, an end time is denoted by $t_{Lr2}$, and displacement of the joint of the model and the joint of the learner at these time points are denoted by $\theta_{Lr1}$, $\theta_{Lr2}$, $\theta_{Er1}$, and $\theta_{Er2}$. The deficiency is interpolated by an expression (9).

$$f_L(t) = \frac{|\theta_{Lr1} - \theta_{Lr2}|}{|\theta_{Er1} - \theta_{Er2}|} f_E(t) - (\theta_{Lr1} - \theta_{Lr2})(t_{Lr} \le t \le t_{Lr2}) \quad (9)$$

The interpolation is performed on each deficiency in the above-described manner.

The processing relating to data display in step S604 is described with reference to FIG. 9 and FIG. 10. FIG. 9 illustrates detailed flow of the processing in step S604. In step S901, the data comparison unit 1009 compares the operation data about the model and the operation data about the learner, and outputs a result of the comparison. The output comparison result includes numerical value information illustrated in the edited data display area 502 and image information illustrated in the image display area 501 in FIG. 5. Only one of the numerical value information and the image information can be output. In the output of the image information, data is displayed in a manner enabling the learner to easily recognize a difference. Examples of the data comparison method include a method of calculating an outline difference between persons as viewed from an optional viewpoint. The learner data (data representing shape and motion of learner) and the model data (data representing shape in case where learner performs motion of model) each include a three-dimensional shape. Therefore, it is possible to calculate a shape to be imaged by a virtual camera placed at an optional viewpoint in a three-dimensional space. For example, determination about a collision between beams emitted from pixels of the virtual camera and the shape data about the object is performed, and pixels in which the collision occurs are labeled. As a result, the outline of the object is calculated. Here, when the outline image of the learner data as viewed from a virtual viewpoint H is denoted by $M_{L,H}$, and the outline image of the model data is denoted by $M_{E,H}$, the data comparison unit 1009 calculates the virtual viewpoint H satisfying an expression (10) and displays the image viewed from the virtual viewpoint H.

$$\hat{H} = \arg \max \|M_{E,H} - M_{L,H}\| \quad (10)$$

In this example, as the viewpoint determined based on the motion information on the learner and the motion information on the model, the image of the viewpoint at which the motion difference between the model and the learner is the largest is displayed, but the viewpoint corresponding to the display image is not limited thereto. For example, an image from a viewpoint at which the motion difference is the smallest can be displayed, or images from a plurality of viewpoints, for example, a side view, a top view, and a front view, can be displayed. In addition to the image for direct comparison between the learner data and the model data, the image representing comparison between the motion of the edited data and the motion of the learner or between the motion of the edited data and the motion of the model can be displayed after the data is edited in step S902.

In step S902, the data editing unit 1010 edits the operation data output in step S803, and outputs the edited operation data to the data comparison unit 1009 and the display method setting unit 1011. The operation data can be edited based on a user operation on the image display area 501 or based on a user operation on the graph in the edited data display area 502. In a case where the operation is performed on the image display area 501, the user can edit the operation data about the learner by three-dimensionally operating the selected joint. In a case where the graph in the edited data display area 502 is edited, the user can edit the operation data about the learner by operating a two-dimensional angle displacement graph of the joint. In the present exemplary embodiment, in the case where the operation data is edited, the edited operation data is separately generated while the original operation data is held. The data editing unit 1010 can automatically edit the operation data based on one or more of the learner data or the model data.

In step S903, the display method setting unit 1011 sets a method of displaying the data output in step S902. The method of displaying the data is set based on an operation on each of the display setting area 503 for model data, the display setting area 504 for estimated data, and the display setting area 505 for edited data. For example, either displaying or not displaying the model data is selected through a model data check box in the display setting area 503 for model data. In a case where the model data is displayed, one or more of the shape data or the skeleton data is displayed. Transparency can be set for each display data, and the display data can be transparently displayed. A display format of the display data can be set, in which, for example, the data is displayed with texture or only the outline is displayed.

After the processing in step S604 ends, the imaging determination unit 1001 determines in step S605 whether to perform imaging of the moving images again based on the input to the user input unit 1012. When the data estimation shifting button 507 is pressed, the screen is returned to the data estimation GUI 300, and the imaging is performed again in response to pressing of the imaging button 303. In a case where the imaging is not to be performed again, the processing ends.

When the learner improves the form using the analysis system 10 according to the present exemplary embodiment, the learner can operate the information processing apparatus 100 after the learner's form is captured, and compare the operation data about the model and the learner's operation data. Alternatively, the comparison can be performed while the imaging is performed. In the case where the comparison is performed while the imaging is performed, the information processing apparatus 100 performs the shape estimation and the skeleton estimation in real time using the data based on the imaging, and displays the image. In this case, the learner corrects the learner's form while viewing the display image, thereby gradually reducing a difference from the model. For example, the information processing apparatus 100 can first display the image from the viewpoint at which the motion difference between the learner and the model is the greatest, and after the difference at the viewpoint is reduced to a certain degree via form correction, the information processing apparatus 100 can change the display image to an image at a viewpoint at which the motion difference is the second greatest. When the motion difference between the learner and the model is reduced to a certain degree or more at all of the viewpoints, the information processing apparatus 100 can display an image indicating that the motion difference has been reduced on the display unit.

As described above, the information processing apparatus 100 according to the present exemplary embodiment acquires first physical makeup information representing a physical makeup of a first object (e.g., learner). The first physical makeup information is information generated based on images obtained by imaging the first object by the plurality of cameras in the plurality of directions. The information processing apparatus 100 acquires second physical makeup information representing a physical makeup of a second object (e.g., model) and motion information representing motion of a plurality of parts of the second object. The information processing apparatus 100 generates motion information associated with the first physical makeup information based on the second physical makeup information and the motion information relating to the second object. According to the above-described configuration, it is possible to provide a result of applying the motion of the second object to the physical makeup of the first object different from the second object. For example, an image representing a state where the learner performs the motion of the model can be displayed on the display unit.

The information processing apparatus 100 displays, on the display unit, the normal image of the learner and the image of the learner performing the motion of the model, which enables the user to easily compare the motion of the learner and the motion of the model. The information processing apparatus 100 performs one or more of the positioning or the time synchronization between the motion data about the learner and the motion data about the model, and superimposes and displays the motion image of the model and the motion image of the learner, which facilitates the comparison between the motion of the learner and the motion of the model. The information processing apparatus 100 displays the image from the viewpoint at which the motion difference between the learner and the model is the greatest, which further facilitates the comparison between the motion of the learner and the motion of the model. The learner can easily improve the learner's motion by viewing the image displayed in such a manner, as compared with the existing technology. The information processing apparatus 100 also outputs a result (e.g., angle information on a joint) of the comparison between the motion of the learner and the motion of the model, which enables the learner to numerically grasp the difference from the model.

In the present exemplary embodiment, the case where the image representing the motion of the model and the image representing the motion of the learner are superimposed and displayed has been described, but the display mode is not limited thereto. For example, the image representing the motion of the model and the image representing the motion of the learner can be arranged and displayed side by side. A moving image representing the motion of the model and a still image of the learner can be displayed. Just the image of the learner performing the motion of the model that is acquired by applying the motion of the model to the physical makeup of the learner can be displayed.

In the present exemplary embodiment, the case where the physical makeup information representing the physical makeup of the object includes the three-dimensional shape information on the object and the skeleton information representing the positions of the joints has been described, but the contents of the physical makeup information are not limited thereto. For example, the physical makeup information on the learner and the model acquired by the information processing apparatus 100 can include just the three-dimensional shape information or the skeleton information. For example, the information processing apparatus 100 can acquire data representing the two-dimensional shape of the learner as the physical makeup information, and can apply the motion data about the model to the data representing the two-dimensional shape of the learner. For example, the physical makeup information can be one or more of information relating to a body height of the object, information relating to a weight, and information relating to a figure (such as skinny figure and obese figure), etc. The information processing apparatus 100 can receive input of such physical makeup information on the learner, correct the operation data about the model based on the input information, and display the image representing the corrected motion. When the operation data about the model is applied to the information such as the skeleton data about the learner acquired based on the imaging, an image close to an image of the actual learner performing the motion of the model can be acquired. According to the method of correcting the motion data about the model based on the physical makeup information input by the user operation without using the captured image, it is possible to reduce a processing amount of the system and to reduce effort of the user for the imaging.

In the present exemplary embodiment, the case where the motion of the learner and the motion of the model are compared has been described, but the above-described configuration can be applied to compare the shape of the learner and the shape of the model. Methods similar to those described above can be used for the positioning, the time synchronization, the deficiency interpolation, and the data display using the GUI.

The above-described exemplary embodiment can provide information useful for a person to achieve motion of another person.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-125011, filed Jun. 29, 2018, which is hereby incorporated by reference herein in its entirety.

What is claimed is:

1. An information processing apparatus, comprising:
one or more memories storing instructions; and
one or more processors executing the instructions to:
acquire a part of three-dimensional shape data of a first subject and position information indicating a three-dimensional position of a part of a skeleton of the first subject at a first timing in a motion, position information indicating a three-dimensional position of a part of a skeleton of a second subject at the first timing in the motion, position information indicating a three-dimensional position of the part of the skeleton of the first subject at a second timing different from the first timing in the motion, and position information indicating the three-dimensional position of the part of the skeleton of the second subject at the second timing in the motion;
perform control to associate the part of the three-dimensional shape data of the first subject with the part of the skeleton of the first subject;
change, by changing the three-dimensional position of the part of the skeleton of the first subject at the second timing based on the three-dimensional position of the part of the skeleton of the first subject at the first timing and based on the three-dimensional position of the part of the skeleton of the second subject at the first timing and the three-dimensional position of the part of the skeleton of the second subject at the second timing, the three-dimensional position of the part of the skeleton of the first subject at the second timing, and
cause a display to display a virtual viewpoint image generated based (1) on a virtual viewpoint, (2) the changed part obtained by changing the three-dimensional position of the part of the skeleton of the first subject at the second timing, and (3) on the part of the three-dimensional shape data of the first subject corresponding to the part of the skeleton of the first subject.

2. The information processing apparatus according to claim 1,
wherein, in the changing, motion information of the second subject is determined based on the three-dimensional position of the part of the skeleton of the second subject at the first timing and the three-dimensional position of the part of the part of the skeleton of the second subject at the second timing, and the three-dimensional position of the part of the skeleton of the first subject at the second timing is changed based on the motion information of the second subject and the three-dimensional position of the part of the skeleton of the first subject at the first timing.

3. The information processing apparatus according to claim 2,
wherein the motion information of the second subject is information that is determined by a difference between the three-dimensional position of the part of the skeleton of the second subject at the first timing and the three-dimensional position of the part of the skeleton of the second subject at the second timing and indicates a degree of a bent of a joint related to a part of the skeleton of the second subject.

4. The information processing apparatus according to claim 1,
wherein the first timing is a point in time of start of the motion, and
wherein the second timing is a point in time of end of the motion.

5. The information processing apparatus according to claim 1,
wherein the motion is a motion of golf swing.

6. The information processing apparatus according to claim 1,
wherein the displayed virtual viewpoint image is an image in which an image representing the part of the three-dimensional shape data of the first subject at the acquired position of the part of the skeleton of the first subject at the second timing, and an image representing the part of the three-dimensional shape data of the first subject at the changed position of the part of the skeleton of the first subject at the second timing, are superimposed.

7. The information processing apparatus according to claim 6,
wherein the displayed virtual viewpoint image is an image in which the image representing the part of the three-dimensional shape data of the first subject at the acquired position of the part of the skeleton of the first subject at the second timing, acquired by the acquiring, and the image representing the part of the three-dimensional shape data of the first subject at the changed position of the part of the skeleton of the first subject at the second timing, changed by the changing, are displayed transparently or translucently at least one of them.

8. The information processing apparatus according to claim 1,
wherein the displayed virtual viewpoint image is an image in which an image representing the part of the three-dimensional shape data of the first subject at the acquired position of the part of the skeleton of the first subject at the second timing, acquired by the acquiring, and an image representing the part of the three-dimensional shape data of the first subject at the changed position of the part of the skeleton of the first subject at the second timing, changed by the changing, are displayed side by side.

9. The information processing apparatus according to claim 1,
wherein the one or more processors further execute the instructions to:
acquire a part of three-dimensional shape data of the second subject; and
generate a comparison image of the second subject by displaying the part of the three-dimensional shape data of the second subject at each of the acquired position of the part of the skeleton of the first subject at the second timing, acquired by the acquiring, and the changed position of the part of the skeleton of the first subject at the second timing, changed by the changing.

10. The information processing apparatus according to claim 1,
wherein the one or more processors further execute the instructions to:
cause the display to display a difference between motion information of the first subject and motion information of the second subject, wherein the motion information of the first subject is determined based on the three-dimensional position of the part of the three-dimensional shape data of the first subject at the first timing and the three-dimensional position of the part of the three-dimensional shape data of the first subject at the second timing, and the motion information of the second subject is determined based on the three-dimensional position of the part of the three-dimensional shape data of the second subject at the first timing and the three-dimensional position of the part of the three-dimensional shape data of the second subject at the second timing.

11. The information processing apparatus according to claim 10,
wherein, in the displaying, a graph that shows the difference between the motion information of the first subject and the motion information of the second subject is displayed, wherein the motion information of the first subject is determined based on the three-dimensional position of the part of the three-dimensional shape data of the first subject at the first timing and the three-dimensional position of the part of the three-dimensional shape data of the first subject at the second timing, and the motion information of the second subject is determined based on the three-dimensional position of the part of the three-dimensional shape data of the second subject at the first timing and the three-dimensional position of the part of the three-dimensional shape data of the second subject at the second timing.

12. The information processing apparatus according to claim 1,
wherein the first subject is a person, and the second subject is a person different in skeleton from the first subject.

13. The information processing apparatus according to claim 12,
wherein the first subject is a learner, and the second subject is a model.

14. The information processing apparatus according to claim 12,
wherein the part of the three-dimensional shape data of the first subject is a wrist of the first subject, and the part of the three-dimensional shape data of the second subject is a wrist of the second subject.

15. The information processing apparatus according to claim 1,
wherein the one or more processors further execute the instructions to:
acquire angle information indicating an angle of a third joint specified based on a position of the third joint in contact with a second part of the skeleton of the second subject and a position of a fourth joint in contact with the second part, wherein the angle of the third joint is an angle at which the third joint rotates from the first timing to the second timing;
acquire positions of a first joint and a second joint that are in contact with a first part of the skeleton of the first subject, wherein the first joint is in association with the third joint, and the second joint is in association with the fourth joint;
change an angle of the first joint based on the angle information, the position of the first joint of the first subject, and the position of the second joint of the first subject,
wherein the virtual viewpoint image generated based on the virtual viewpoint and the changed angle of the first joint of the first subject.

16. The information processing apparatus according to claim 1, wherein an angle of a first joint is specified based on a reference direction.

17. The information processing apparatus according to claim 1, wherein the skeleton of the first subject is represented by a plurality of joints of the first subject and a plurality of lines connecting the plurality of joints,
wherein the skeleton of the second subject represents is represented by a plurality of joints of the second subject and a plurality of lines connecting the plurality of joints.

18. An information processing method, comprising:
acquiring a part of three-dimensional shape data of a first subject and position information indicating a three-dimensional position of a part of a skeleton of the first subject at a first timing in a motion, position information indicating a three-dimensional position of the part of a skeleton of a second subject at the first timing in the motion, position information indicating a three-dimensional position of the part of the skeleton of the first subject at a second timing different from the first timing in the motion, and position information indicating the three-dimensional position of the part of the skeleton of the second subject at the second timing in the motion;
performing control to associate the part of the three-dimensional shape data of the first subject with the part of the skeleton of the first subject;
changing, by changing the three-dimensional position of the part of the skeleton of the first subject at the second timing based on the three-dimensional position of the part of the skeleton of the first subject at the first timing and based on the three-dimensional position of the part of the skeleton of the second subject at the first timing and the three-dimensional position of the part of the skeleton of the second subject at the second timing, the three-dimensional position of the part of the skeleton of the first subject at the second timing; and
causing a display to display a virtual viewpoint image generated based (1) on a virtual viewpoint, (2) the changed part obtained by changing the three-dimensional position of the part of the skeleton of the first subject at the second timing, and (3) on the part of the three-dimensional shape data of the first subject corresponding to the part of the skeleton of the first subject.

19. A non-transitory computer-readable storage medium storing a program causing a computer to execute the information processing method comprising:

acquiring a part of three-dimensional shape data of a first subject and position information indicating a three-dimensional position of a part of a skeleton of the first subject at a first timing in a motion, position information indicating a three-dimensional position of the part of a skeleton of a second subject at the first timing in the motion, position information indicating a three-dimensional position of the part of the skeleton of the first subject at a second timing different from the first timing in the motion, and position information indicating the three-dimensional position of the part of the skeleton of the second subject at the second timing in the motion;

performing control to associate the part of the three-dimensional shape data of the first subject with the part of the skeleton of the first subject;

changing, by changing the three-dimensional position of the part of the skeleton of the first subject at the second timing based on the three-dimensional position of the part of the skeleton of the first subject at the first timing and based on the three-dimensional position of the part of the skeleton of the second subject at the first timing and the three-dimensional position of the part of the skeleton of the second subject at the second timing, the three-dimensional position of the part of the skeleton of the first subject at the second timing; and causing a display to display a virtual viewpoint image generated based (1) on a virtual viewpoint, (2) the changed part obtained by changing the three-dimensional position of the part of the skeleton of the first subject at the second timing, and (3) on the part of the three-dimensional shape data of the first subject corresponding to the part of the skeleton of the first subject.

\* \* \* \* \*